Patented Mar. 15, 1932

1,849,444

UNITED STATES PATENT OFFICE

KARL WILKE, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

PREPARATION OF ORTHO-AMINO-CARBOXYLIC ACID ESTERS OF THE ANTHRAQUINONE SERIES

No Drawing. Application filed June 5, 1930, Serial No. 459,432, and in Germany June 14, 1929.

My present invention relates to the preparation of ortho-amino-carboxylic acid esters of the anthraquinone series.

In my copending U. S. application Ser. No. 369,015, filed June 8th, 1929, I have shown that anthraquinone-1.2-isoxazoles are capable of reacting in the presence of an agent of alkaline action with an aliphatic or aromatic alcohol with the formation of the esters of 1-aminoanthraquinone-2-carboxylic acid.

Now I have found that ortho-amino-carboxylic acid esters are likewise obtainable by causing an anthraquinone-1.2-isoxazole to react with an aliphatic or aromatic alcohol in the absence of a condensing agent.

When using phenol, my process can be carried out only with difficulty inasmuch as phenol exerts a strong reducing action.

My process is especially advantageous when using as the one of the reaction components an alcohol of the following general formula: $R_1.CH_2.OH$ wherein $R_1$ stands for hydrogen, alkyl or phenyl.

The following examples illustrate the invention, but they are not intended to limit it thereto, the parts being by weight:

(1) 30 parts of anthraquinone-1.2-isoxazole are heated under reflux with 1500 parts of absolute ethyl alcohol until the yellow isoxazole has disappeared and a red product has been formed in a yellowish red solution. The alcohol is then distilled off and the dry residue is dissolved with about 10 parts of boiling glacial acetic acid. The amino-aldehyde which has been obtained as a by-product from the isoxazole by the reducing action of the alcohol is precipitated in the form of an insoluble azine by means of hydrazine. On cooling the hot filtrate, the 1-aminoanthraquinone-2-carboxylic acid ethylester crystallizes in the form of orange-red crystals.

The reaction takes the following course:

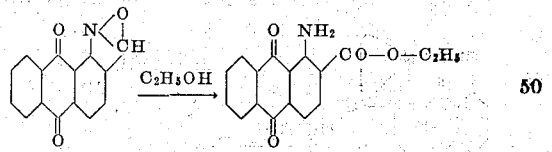

(2) 50 parts of the yellow anthraquinone-1.2-isoxazole and 500 parts of methyl alcohol are heated in an autoclave for 6 hours to 100° C. while stirring. After cooling, the product is filtered, washed with methyl alcohol and dried. The crude 1-amino-anthraquinone-2-carboxylic acid methyl ester is obtained in the form of a red powder melting at about 190° C.-195° C. Its yield amounts to 50 parts. The crude product may be purified as described in Example 1 by dissolving it in boiling glacial acetic acid, precipitating a relatively small quantity of aldehyde in the form of azine, filtrating and concentrating the filtrate until crystallization sets in. On cooling, the purified amino-carboxylic acid methyl ester separates in the form of brown-red crystals melting at 227° C.-228° C. The following formulae illustrate the course of the reaction:

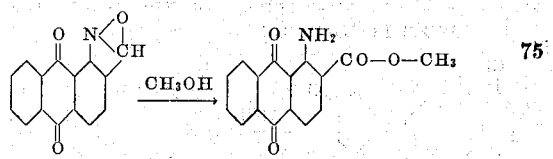

(3) 200 parts of anthraquinone-1.2-isoxazole are heated while stirring with 1000 parts of benzyl alcohol for 1 hour in an oil bath at an exterior temperature of 160° C., whereby a red solution is formed. After sufficiently cooling, the solution is diluted with 750 parts of alcohol and allowed to crystallize. The mixture is then filtered, the mass remaining on the filter is washed with alcohol and dried. It is then introduced into 10 parts of boiling glacial acetic acid from which, on cooling slowly, the 1 amino-anthraquinone-2-carboxylic acid benzyl ester crystallizes in the form of course, deep red, laminæ-like crystalline aggregates of a greenish lustre. The product melts at 182° C.

The reaction takes the following course:

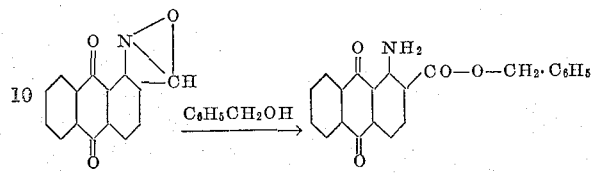

(4) 5 parts of yellow 5.8-dichlor-anthraquinone-1.2-isoxazole are heated to boiling under reflux for 2 hours with 150 parts of amyl alcohol. There is obtained a yellowish red solution from which, on cooling, about 5 parts of the crude 1-amino-5.8-dichloranthraquinone-2-carboxylic acid amyl ester precipitate in the form of red crystals.

The reaction takes the following course:

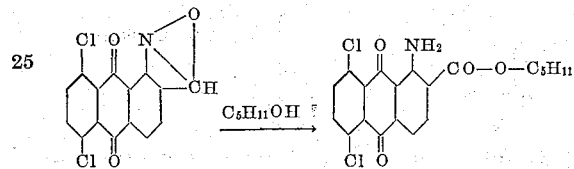

The crude product is dissolved in a solution of boiling glacial acetic acid from which, on addition of hydrazine, a small quantity (0.6 part) of insoluble aldehydrazine precipitates; the solution is filtered and the amyl ester crystallizes from the concentrated filtrate in the form of red crystalline needles melting at 124° C.

The dichloranthraquinone-isoxazole used in this example is obtainable according to known methods by condensing dichlorphthalic acid with toluene first into ortho-toluyl-dichlorbenzoic acid, melting at 162° C. and then into 2-methyl-5.8-dichlor-anthraquinone, melting at 244° C., nitrating this product into 1-nitro-2-methyl-5.8-dichloranthraquinone, melting at 242° C. and causing fuming sulfuric acid to act upon the latter product, whereby the above mentioned isoxazole is formed:

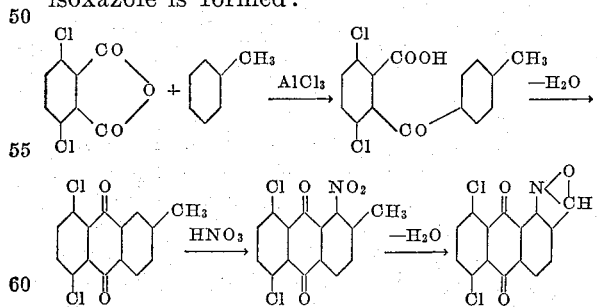

I claim:

1. The process which comprises causing an anthraquinone-1.2-isoxazole to react with an alcohol of the general formula: R—OH wherein R stands for alkyl or aralkyl, by heating a mixture of the components.

2. The process which comprises causing an anthraquinone-1.2-isoxazole to react with an alcohol of the general formula: $R_1$—$CH_2$—OH wherein $R_1$ stands for hydrogen, alkyl or phenyl, by heating a mixture of the components.

3. The process which comprises causing an anthraquinone-1.2-isoxazole to react with benzyl alcohol, by heating a mixture of the components.

4. The process which comprises heating, while stirring, an anthraquinone-1.2-isoxazole with benzyl alcohol in an oil bath having a temperature of about 160° C.

In testimony whereof, I affix my signature.

KARL WILKE.